(12) United States Patent
Kim et al.

(10) Patent No.: US 9,710,066 B2
(45) Date of Patent: Jul. 18, 2017

(54) METHOD FOR CONTROLLING A TERMINAL USING A DOUBLE TOUCH GESTURE AND TERMINAL THEREOF

(71) Applicant: LG ELECTRONICS INC., Seoul (KR)

(72) Inventors: EunKyung Kim, Seoul (KR); Changhee Han, Seoul (KR); Kang Lee, Seoul (KR); Taehyun Lim, Seoul (KR); Byoungkwon Roh, Seoul (KR); Kyoungjin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 272 days.

(21) Appl. No.: 13/956,706

(22) Filed: Aug. 1, 2013

(65) Prior Publication Data

US 2014/0191986 A1 Jul. 10, 2014

(30) Foreign Application Priority Data

Jan. 4, 2013 (KR) ........................ 10-2013-0001274

(51) Int. Cl.
| | |
|---|---|
| G06F 3/01 | (2006.01) |
| G06F 3/0486 | (2013.01) |
| G06F 3/041 | (2006.01) |
| G06F 3/0488 | (2013.01) |

(52) U.S. Cl.
CPC .............. G06F 3/017 (2013.01); G06F 3/041 (2013.01); G06F 3/0486 (2013.01); G06F 3/0488 (2013.01)

(58) Field of Classification Search
CPC ........ G06F 3/017; G06F 3/0486; G06F 3/041; G06F 3/0488
See application file for complete search history.

(56) References Cited

U.S. PATENT DOCUMENTS

| | | | |
|---|---|---|---|
| 7,925,996 B2* | 4/2011 | Hofmeister et al. | 715/863 |
| 8,169,414 B2* | 5/2012 | Lim | 345/173 |
| 8,224,392 B2* | 7/2012 | Kim et al. | 455/566 |
| 2008/0036743 A1 | 2/2008 | Westerman et al. | |
| 2011/0300910 A1 | 12/2011 | Choi | |
| 2012/0081269 A1* | 4/2012 | de Paz | 345/1.3 |

(Continued)

FOREIGN PATENT DOCUMENTS

| | | |
|---|---|---|
| CN | 101458591 A | 6/2009 |
| CN | 101636711 A | 1/2010 |

(Continued)

Primary Examiner — Andrew Sasinowski
(74) Attorney, Agent, or Firm — Birch, Stewart, Kolasch & Birch, LLP

(57) ABSTRACT

A mobile terminal including a wireless communication unit configured to wirelessly communicate with at least one other terminal; a touch screen display; and a controller configured to select an object displayed on the touch screen display based on a first touch gesture input with respect to the object, perform a second touch gesture a predetermined time after the first touch gesture, in which the second touch gesture has a dragging direction, and perform a first preset function based on the second touch gesture having a first dragging direction and perform a second preset function based on the second touch gesture having a second direction different than the first direction.

12 Claims, 24 Drawing Sheets

(56) References Cited

U.S. PATENT DOCUMENTS

2012/0172020 A1* 7/2012 Forstall et al. ............... 455/415
2012/0174026 A1* 7/2012 Shim et al. ................... 715/784
2012/0192113 A1* 7/2012 Higuchi ........................ 715/835

FOREIGN PATENT DOCUMENTS

| CN | 102355526 A | 2/2012 |
| CN | 102591558 A | 7/2012 |
| EP | 2 249 240 A1 | 11/2010 |
| EP | 2472378 A2 | 7/2012 |

* cited by examiner

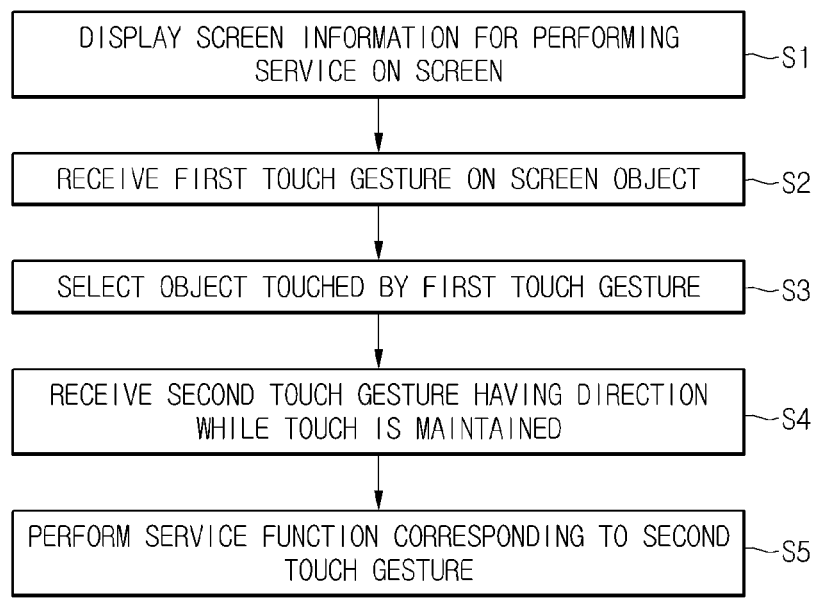

FIG.4

| FUNCTION WHICH CAN BE SET TO DOUBLE TOUCH GESTURE |
|---|

CREATE AND MODIFY CONTENT
   ADD HOME SCREEN
   WRITE OFFICE DOCUMENT
   PHOTOGRAPH GALLERY PICTURE
   WRITE TEXT MESSAGE
   ADD PHONE BOOK CONTACT
   DELETE HOME SCREEN
   ADD HOME SCREEN
   REPLACE HOME SCREEN

MANAGE AND MOVE QUICK PAGE
   WEB BROWSING
   GALLERY
   TEXT
   PHONE BOOK (a)  (b)

METHOD FOR CONTROLLING A TERMINAL USING A DOUBLE TOUCH GESTURE AND TERMINAL THEREOF

CROSS-REFERENCE TO RELATED APPLICATIONS

The present application claims priority under 35 U.S.C. 119 and 35 U.S.C. 365 to Korean Patent Application No. 10-2013-0001274 (filed on Jan. 4, 2013), which is hereby incorporated by reference in its entirety.

BACKGROUND OF THE INVENTION

Field of the Invention

The present invention relates to a method of controlling a mobile terminal using a double touch gesture.

Discussion of the Background

A terminal may be divided into a mobile terminal and a stationary terminal. The mobile terminal may also be divided into a handheld terminal and a vehicle mount terminal. Further, the terminal include various diversified functions including voice communication, text messaging, sending emails, capturing videos, reproducing a music or video file, a game, and receiving a broadcast.

A user can also control the different terminal functions through touch actions performed on the display. For example, a user can zoom in or out on contents using a pinch zoom in or a pinch zoom out gesture. However, the gestures used for controlling the mobile terminal are limited.

SUMMARY OF THE INVENTION

Accordingly, one aspect of the present invention is to address the above noted and other problems of the related art.

Another aspect of the present invention is to provide a mobile terminal and corresponding control method using a double touch gesture including a second touch gesture having a direction input after a first touch gesture, and performing a service function intuitively expected for the second touch gesture.

To achieve these and other advantages and in accordance with the purpose of the present invention, as embodied and broadly described herein, the present invention provides in one aspect a mobile terminal including a wireless communication unit configured to wirelessly communicate with at least one other terminal; a touch screen display; and a controller configured to select an object displayed on the touch screen display based on a first touch gesture input with respect to the object, perform a second touch gesture a predetermined time after the first touch gesture, in which the second touch gesture has a dragging direction, and perform a first preset function based on the second touch gesture having a first dragging direction and perform a second preset function based on the second touch gesture having a second direction different than the first direction. The present invention also provides a corresponding method of controlling a mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 2 is an overview including multiple touch gestures which can be set in a mobile terminal according to an embodiment of the present invention;

FIG. 3 is flowchart illustrating a method of controlling a mobile terminal according to an embodiment of the present invention;

FIG. 4 is an overview including service functions which can be set to a double touch gesture according to an embodiment of the present invention;

DETAILED DESCRIPTION OF THE EMBODIMENTS

Hereinafter, embodiments of the present invention will be described in detail with reference to accompanying drawings. Embodiments described herein are provided for illustrative purposes only to help understanding of the present invention. Therefore, the present invention is not limited to embodiments described herein and may be embodied in different forms.

A mobile terminal described herein may include a portable phone, a smart phone, a pad, a note, a tablet PC, a laptop computer, a digital broadcast terminal, a personal digital assistant (PDA), a portable multimedia player (PMP), and navigation. However, the present invention is applicable to a stationary terminal such as a digital TV or a desktop computer.

Figure 1:
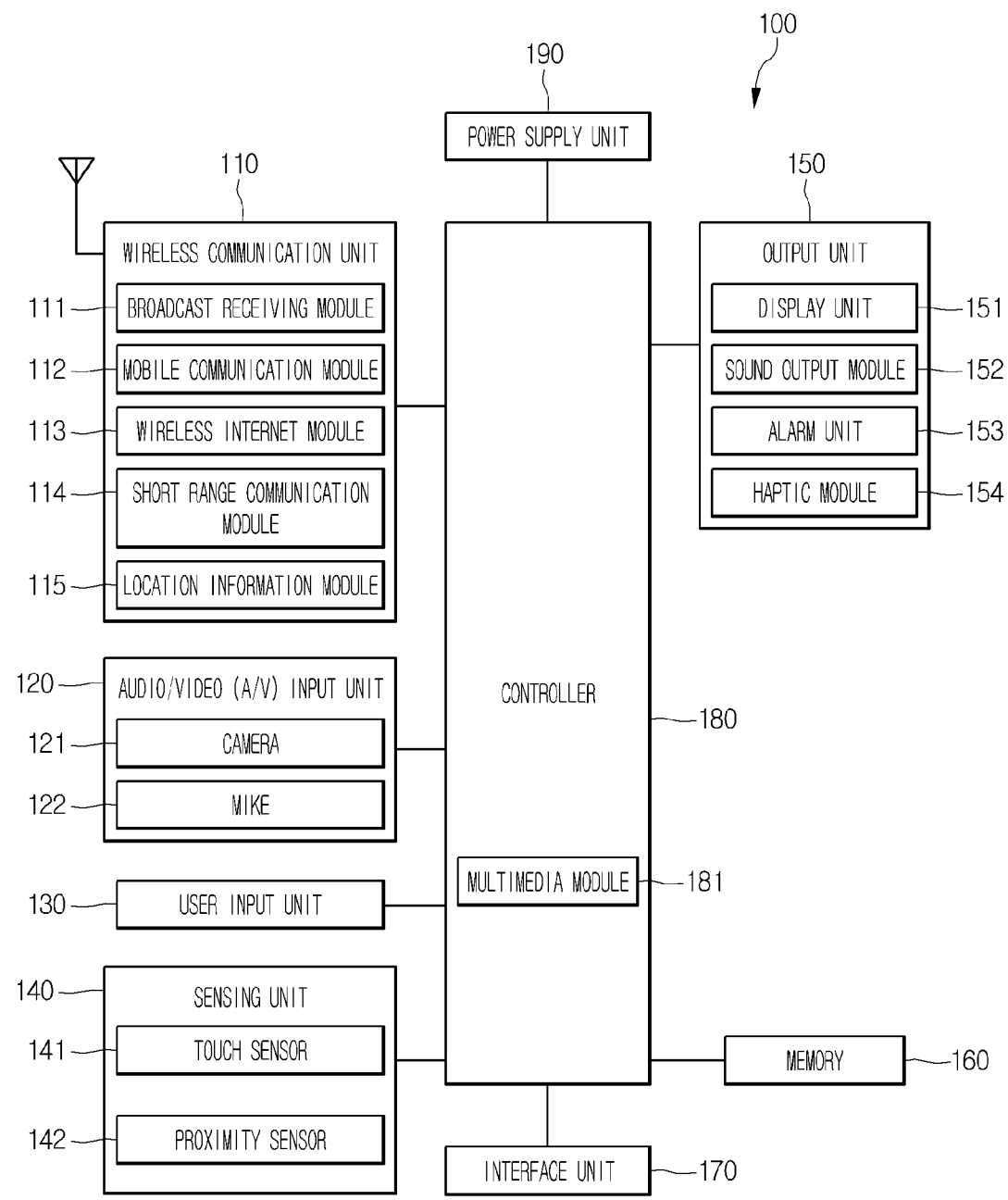
FIG. 1 is a block diagram of a mobile terminal according to an embodiment of the present invention.

FIG. 1 is a block diagram of a mobile terminal 100 according to an embodiment of the present invention. Referring to FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. A mobile terminal having more elements or fewer elements may be also implemented.

The mobile terminal 100 may include a multi mode portable terminal which respectively connects to communication networks according to at least two communication methods or at least two operators and a multi standby portable terminal which simultaneously connects to communication networks according to at least two communication methods or at least two operators.

Hereinafter, for illustrative purposes, a mobile terminal according to an embodiment of the present invention is described to be the multi standby mobile terminal as an example. The multi standby mobile terminal is a portable terminal which simultaneously connects to three communication networks selected from a plurality of communication methods including, for example, Code Division Multiple Access (CDMA), Global System for Mobile telecommunication (GSM), Wideband Code Division Multiple Access (WCDMA), or Wireless broadband (Wibro) or, in the case of Korea, simultaneously connects to three communication networks selected from a plurality of operators including, for example, SKT, KTF, and LGT.

The wireless communication unit 110 may include at least one module which enables a wireless communication between the mobile terminal 100 and a wireless communication system or between the mobile terminal 100 and a network in which the mobile terminal 100 is located. For example, in FIG. 1, the wireless communication unit 110 includes a broadcast receiving module 111, a mobile communication module 112, a wireless internet module 113, a short range communication module 114, and a location information module 115.

The broadcast receiving module 111 receives a broadcast signal and/or broadcast related information from an external broadcast management server through a broadcast channel. Here, the broadcast channel may include a satellite channel and a terrestrial channel. The broadcast management server refers to a server which generates and transmits the broadcast signal and/or the broadcast related information or a server which receives an already generated broadcast signal and/or broadcast related information and transmits the already generated broadcast signal and/or broadcast related information to the terminal. The broadcast signal may include not only a TV broadcast signal, a radio broadcast signal, and a data broadcast signal but also a broadcast signal having a form in which the data broadcast signal is coupled to the TV broadcast signal or the radio broadcast signal.

The broadcast related information may indicate information related to a broadcast channel, a broadcast program, or a broadcast service provider. The broadcast related information may be provided through a mobile communication network. In this instance, the broadcast related information may be received by the mobile communication module 112. The broadcast related information may exist in a form of Electronic Program Guide (EPG) of Digital Multimedia Broadcasting (DMB) or Electronic Service Guide (ESG) of Digital Video Broadcast-Handheld (DVB-H).

The broadcast receiving module 111 may receive a digital broadcast signal using a digital broadcast system such as Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), or Integrated Services Digital Broadcast-Terrestrial (ISDB-T). It should be noted that the broadcast receiving module 111 may be comprised to be suitable not only for the above described digital broadcast system but also other broadcast systems. The broadcast signal and/or broadcast related information received through the broadcast receiving module 111 may also be stored in the memory 160.

The mobile communication module 112 transmits and receives a wireless signal to/from at least one of a base station, an external terminal, and a server on the mobile communication network. Here, the wireless signal may include a voice call signal, a video call signal, or a data in various forms according to transmitting and receiving a character/multimedia message.

The wireless internet module 113 refers to a module for wireless internet connection and may be built in or built out of the mobile terminal 100. A wireless internet technology such as Wireless LAN (WLAN) (Wi-Fi), Wireless broadband (Wibro), World Interoperability for Microwave Access (Wimax), or High Speed Downlink Packet Access (HSDPA) may be used.

The short range communication module 114 refers to a module for a short range communication. A short range communication technology such as Bluetooth, Radio Frequency Identification (RFID), infrared Data Association (IrDA), Ultra Wideband (UWB), or ZigBee may be used. The location information module 115 is a module for obtaining a location of the mobile terminal and, for example, a global position system (GPS) module.

In addition, the audio/video (A/V) input unit 120 is for inputting an audio signal or a video signal and may include a camera 121 and a microphone (mike) 122. The camera 121 processes a still image obtained by an image sensor in a video call mode or a photographing mode or a video frame such as a moving image. The processed video frame may be displayed on the display unit 151.

The video frame processed by the camera 121 may be stored in the memory 160 or externally transmitted through a wireless communication unit 110. Two or more cameras 121 may be included depending on a user environment.

The mike 122 receives an external sound signal by a microphone in a call mode, a recording mode, or a voice recognition mode and processes the sound signal to be an electrical voice data. For the call mode, the processed voice data may be converted in a form transmittable to a mobile communication base station through the mobile communication module 112 to be outputted. In the mike 122, various noise removal algorithms for removing a noise generated during a process of receiving the external sound signal may be implemented.

The user input unit 130 generates an input data for controlling an operation of the terminal by a user. The user input unit 130 may include, for example, a key pad, a dome switch, a touch pad (constant voltage/constant current), a jog wheel, or a jog switch. The user input unit 130 may include an identification module selection switch for generating a selection signal for selecting a certain identification module among a plurality of selection modules.

The sensing unit 140 can detect a current state of the mobile terminal 100 such as an opening/closing state of the mobile terminal 100, a location of the mobile terminal 100, whether contacted by the user, an orientation of the mobile terminal, or an acceleration/deceleration of the mobile terminal to generate a sensing signal for controlling an operation of the mobile terminal 100. For example, when the mobile terminal 100 is a slide phone type, whether the slide phone is opened or closed can be sensed. Also, whether a power is supplied to the power supply unit 190 or whether an external device is coupled to the interface unit 170 may be sensed. The sensing unit 140 may include, for example, a touch sensor 141 and a proximity sensor 142. The touch sensor 141 is a sensor for detecting a touch operation. For example, the touch sensor 141 may have a form of a touch film, a touch sheet, or a touch pad.

The touch sensor 141 may have an inter layer structure (hereinafter, referred to as "touch screen") with a display unit 151. The touch sensor 141 may be configured to convert a pressure applied to a specific part of the display unit 151 or a change in capacitance generated at the specific part of the display unit 151 into an electrical input signal. The touch sensor 141 may be configured to detect not only a touched location and area but also a pressure by a touch.

When a touch input on the touch sensor 141 exits, a signal (or signals) corresponding thereto is transmitted to a touch controller. The touch controller processes the signal (or signals) and then transmits a corresponding data to the controller 180. Thus, the controller 180 can determine which area of the display unit 151 is touched.

The proximity sensor 142 may be disposed in an internal area of the mobile terminal surrounded by the touch screen or near the touch screen. The proximity sensor 142 refers to a sensor for detecting existence of an object which approaches a predetermined detection surface or exists in proximity using a force in an electromagnetic field or an infrared light, without a mechanical contact. Further, the proximity sensor 142 has a longer lifespan than a contact sensor and has higher utility.

An example of the proximity sensor 142 includes a transmissive photoelectric sensor, a direct reflective photoelectric sensor, a mirror reflective photoelectric sensor, a high frequency oscillation proximity sensor, a capacitive proximity sensor, a magnetic proximity sensor, and an infrared light proximity sensor. When the touch screen is capacitive, the touch screen is configured to detect a proximity of a pointer by a change in an electric field due to the proximity of the pointer. In this case, the touch screen (touch sensor) may be classified into the proximity sensor.

A "proximity touch" refers to an act of rendering a pointer which does not contact the touch screen but approaches the touch screen to be recognized as being located on the touch screen. A "contact touch" refers to an act of actually contacting the pointer on the touch screen. A location at which the pointer has the proximity touch on the touch screen means a location to which the pointer vertically corresponds with respect to the touch screen when the pointer has the proximity touch.

The proximity sensor 142 detects the proximity touch and a proximity touch pattern (e.g., a proximity touch distance, a proximity touch direction, a proximity touch speed, a proximity touch time, a proximity touch location, a proximity touch movement, etc.). Information corresponding to the detected proximity touch and the proximity touch pattern may be output on the touch screen.

The output unit 150 is used to generate an output related sight, hearing, or touch, and the output unit 150 may include the display unit 151, a sound output module 152, an alarm unit 153, and a haptic module 154.

The display unit 151 displays (outputs) information processed in the mobile terminal 100. For example, when the mobile terminal is in the call mode, a user interface (UI) or a graphic user interface (GUI) related to a call is displayed. When the mobile terminal 100 is in the video call mode or the photographing mode, an image photographed and/or received, UI, or GUI is displayed.

The display unit 151 may include at least one of a liquid crystal display (LCD), a thin film transistor-liquid crystal display (TFT LCD), an organic light-emitting diode (OLED), a flexible display, a three dimensional (3D) display.

Some displays may be formed in a transparent or a light transmissive type such that an outside can be seen therethrough. This type of display is called as a transparent display, and a representative example of the transparent display is a transparent OLED (TOLED). A rear structure of the display unit 151 may also be configured in the light transmissive type. Through this structure, the user can see an object located in a back of a terminal body through an area occupied by the display unit 151 of the terminal body.

Depending on an implementation form of the mobile terminal 100, two or more display units 151 may exist. For example, in the mobile terminal 100, a plurality of displays may be separated on a surface or integrally disposed or disposed respectively on different surfaces.

The sound output module 152 can output an audio data received from the wireless communication unit 110 upon a call signal receipt, in the call mode, the recording mode, the voice recognition mode or the broadcast receiving mode or stored in the memory 160. The sound output module 152 may output a sound signal related to a function (e.g., a call signal receipt sound, a message receipt sound, etc.) which is performed by the mobile terminal 100. The sound output module 152 may include a receiver, a speaker, or a buzzer.

The alarm unit 153 outputs a signal for notifying an event generation of the mobile terminal 100. An example of an event generated in the mobile terminal includes a call signal receipt, a message receipt, a key signal input, and a touch input. The alarm unit 153 can output a signal other than a video signal or an audio signal, e.g., a signal for notifying the event generation by vibration. The video signal or the audio signal may be output through the display unit 151 or the voice output module 152. Therefore, the display unit 151 or the voice output module 152 may be classified as a part of the alarm unit 153.

The haptic module 154 generates various touch effects which can be felt by the user. A representative example of a touch effect generated by the haptic module 154 is vibration. A strength and a pattern of the vibration of the haptic module 154 may be controlled. For example, different vibrations may be synthesized to be output or sequentially output.

The haptic module 154 may generate various touch effects other than vibration such as an effect of a stimulus by, for example, a pin arrangement which moves vertically with respect to a contact skin surface, an injection force or suction force of an air through an injection hole or a suction hole, brushing a skin surface, a contact of an electrode, or an electrostatic force and an effect of reproducing coldness and hotness using an element capable of heat absorption or heat generation.

The haptic module 154 is not only capable of transmitting the touch effect through a direct touch but also embody the touch effect through a muscle sense of, for example, a finger or an arm of the user. Two or more haptic modules 154 may be provided depending on a type of formation of the mobile terminal 100.

The memory 160 can store a program for operating the controller 180 and may temporarily store input/output data (e.g., an address book, a message, a stationary image, a video, etc.). The memory 160 can also store a data related to vibration of various patterns and sound which are output upon the touch input on the touch screen.

The memory 160 may include at least one type of a storage medium among a flash memory type memory, a hard disk type memory, a multimedia card micro type memory, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optic disk. The terminal 100 may operate in association with a web storage which performs a storage function of the memory 160 on internet.

The interface unit 170 performs a role of a passage with all external devices connected to the mobile terminal 100. The interface unit 170 receives a data from the external device, is provided with a power and transmits the power to each element within the mobile terminal 100, or transmits a data within the mobile terminal 100 to the external device. For example, a wired/wireless headset port, an external charger port, a wired/wireless data port, a memory card port, a port for connecting to an apparatus having an identification module, an audio input/output (I/O) port, a video input/output (I/O) port, and an earphone port may be included in the interface unit 170.

An identification module is a chip for storing various information for authenticating a user access of the mobile terminal 100 and may include a user identify module (UIM), a subscriber identity module (SIM), and a universal subscriber identity module (USIM). The apparatus having the identification module (hereinafter, "identification apparatus") may be manufactured in a smart card form. Therefore, the identification apparatus may be connected to the terminal 100 through a port.

The interface unit 170 may be used as a passage for supplying a power from a cradle to the mobile terminal 100 when the mobile terminal 100 is connected to an external cradle or a passage for transmitting various command signals input from the cradle by the user to the mobile terminal. The various command signals or power input from the cradle may be operated as a signal for recognizing that the mobile terminal 100 is accurately mounted to the cradle.

Further, the controller 180 controls an overall operation of the mobile terminal. For example, the controller 180 can perform control and processing related to the voice call, the data communication, or the video call. The controller 180 may include a multimedia module 181 for reproducing a multimedia. The multimedia module 181 may be implemented within the controller 180 and may be implemented separately from the controller 180.

The controller 180 can also recognize a double touch gesture through the user input unit 130 to perform various functions of the terminal. Here, the double touch gesture indicates two or more touch gestures which are input in association with each other. The double touch gesture according to an embodiment of the present invention includes touch gestures, which are distinguished from a pinch zoom in or a pinch zoom out, where the touch gestures are associated with each other and has a time difference with respect to two points.

The controller 180 can receive the double touch gesture through the user input unit 130 and generate a new content or delete a content in the home screen according to a corresponding double touch gesture. The controller 180 can also perform a function set according to a second touch gesture when the second touch gesture is input when a first touch gesture with respect to an object displayed on the display unit 151 of the terminal is input. Here, the second touch gesture has a direction and is input after the first touch gesture, which holds the object, is maintained during a predetermined time.

Thus, the user can intuitively perform various functions of the terminal in association with the first and second touch gestures. In addition, the first and second touch gestures can be selected in a variety of ways. Further, the second touch gesture has a direction to implement an intuitive user interface.

The power supply unit 190 receives an external power and an internal power according to a control of the controller 180 and supplies a power needed for operating each element.

Next, FIG. 2 is an overview including touch gestures which can be set in a mobile terminal according to an embodiment of the present invention. Referring to FIG. 2, the controller 180 can recognize various touch gestures through the user input unit 130. For example, the touch gestures such as 'tap', 'drag', 'flick', 'swipe', 'double tap' and 'touch and hold' and 'slicing'.

The 'tap' touch gesture is a basic gesture which touches a user interface element on the screen and refers to a motion which contacts a finger or a stylus on the screen during a short time. The 'tap' is similar to a 'single click' of a mouse. The 'drag' touch gesture can be used to scroll the screen in a specific direction while maintaining the drag touch on the screen. For example, a drag gesture may be used to scroll the screen in an up and down direction.

A 'flick' touch gesture is similar to the drag touch gesture but is done in a 'flicking manner' in a shorter time period. For example, the flick gesture is used to quickly scroll the screen upward and downward in the user interface element which can be scrolled. A 'swipe' touch gesture is similar to the touch and drag but the user intensively drags the finger or the stylus from the touch screen. For example, the swipe gesture is used to display a hidden deleted menu corresponding to each item in a list.

A 'double' touch gesture means two continuous tap motions and, for example, is used for zooming in a content or an image to be located centrally or for a zoom out function. Alternatively, when executing (reproducing) an object in which a multimedia is mapped to a drawn pattern, the multimedia mapped to a corresponding pattern may be executed by performing a double tap gesture on a part of the pattern.

A 'touch and hold' touch gesture corresponds to the user touching and holding the touch on the touch screen by the finger or the stylus. The 'touch and hold' touch gesture is also referred to as 'long press.' The user may draw a desired pattern on the screen of the touch pad by using the touch and hold touch gesture. Also, the 'touch and hold' touch gesture is used for a function of displaying an enlarged view of a location of a cursor in an editable text. In addition, the 'touch and hold' touch gesture may be used to overlap a specific pattern with another pattern or connect the specific pattern with another pattern.

A slicing touch gesture is a slicing gesture similar to cutting a fruit in a quick slicing manner. Further, the controller 180 can recognize a multi touch on the touch screen. In this instance, the touch gesture may further include 'pinch open' and 'pinch close' touch gestures.

A 'pinch open' touch gesture is a touch gesture in which two fingers touch the touch screen and are spread apart as if expanding the screen. The pinch open touch gesture is used to zoom in a map screen in a map view. The double tap touch gesture is used to perform an automatic zoom in a predetermined ratio, however, the pinch open gesture is used to adjust a zoom in level based on an extent the user spread the fingers apart.

A 'pinch close' touch gesture is a gesture which is opposite to the pinch open touch gesture and corresponds to a touch gesture in which two fingers touch the touch screen and are placed close together as if shrinking the screen.

Various embodiments described herein may be embodied by, for example, a recording medium readable by a computer or a similar device thereof by using software, hardware, or a combination thereof.

In a hardware implementation, embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and other electrical units for performing functions. In some cases, the embodiments may be implemented by the controller 180.

In a software implementation, embodiments such as a process or a function may be implemented together with a separate software module for performing at least one function or operation. A software code may be implemented by a software application written in an appropriate program language. The software code may be stored in the memory 160 and executed by the controller 180.

Next, FIG. 3 is a method of controlling a mobile terminal using a double touch gesture according to an embodiment of the present invention. Referring to FIG. 3, the controller 180 displays screen information for performing a service on the display unit 151 (S1). The screen information may include various objects used for a service to be performed. For example, the controller 180 may display a home screen, a message screen, a document screen, a gallery screen, a dialogue screen, etc. on the display unit 151.

The controller 180 then receives the first touch gesture with respect to a certain object displayed on the display unit 151 via the user input unit 130 (S2). Here, the first touch gesture may include a touch on the certain object displayed on the display. The controller 180 then selects an object located at a point at which the touch is made by the first touch gesture on the screen (S3).

Further, the controller 180 receives the second touch gesture having a direction through the user input unit 130 after a predetermined amount of time while the first touch gesture is maintained on the screen (S4). The controller 180 then performs a preset service function corresponding to the second touch gesture input through the user input unit (S5).

Next, FIG. 4 is an overview illustrating service functions of the mobile terminal 100, which can be set to a double touch gesture according to an embodiment of the present invention. Referring to FIG. 4, the controller 180 can set various service functions in association with various gestures described in FIG. 2.

The service function which can be set includes a service which generates, deletes, or controls new objects. For example, the user may want to generate or delete a new content in the home screen. In the present invention, the user can do this using the defined double touch gesture.

The user can also select which service function is to be executed based on the first and second touch gestures. Specifically, what touch gestures are combined to set the double touch gesture can be set according to user preference, operator policy, etc.

The controller 180 can also select the object on the screen based on the received first touch gesture. Next, the controller 180 can receive the second touch gesture after a predetermined time while selection of the corresponding object and the touch of the first touch gesture are maintained.

As discussed above, the second touch gesture has a direction and can be input by the user's other hand. The controller 180 can then perform a service function of the terminal set to the second touch gesture.

Here, the first touch gesture includes selecting a specific object and maintaining a touch during a predetermined time. That is, a drag is not necessarily included in the first touch gesture but may be optional. The controller 180 can also hold the object located at a point at which the corresponding first touch gesture is input. Also, the controller 180 can temporarily fix a display screen when the first touch gesture is maintained.

In addition, the controller 180 receives the second touch gesture through the user input unit 130. Here, the second touch gesture includes an intuitive user interface (UI) which performs a content generation service function of adding a new content between preset contents. The added new content may be a content associated with a content of a function currently performed.

The content generation service may include adding a home screen, creating a document, adding a new picture in a gallery, writing a text message, and adding a new contact in an address book. In addition, other functions that can be performed by the second touch gesture in combination with the first touch gesture include deletion or replacement of the content currently provided. Namely, the home screen may be deleted or replaced based on a double touch gesture operation when switching through home screens.

Also, the controller 180 may gather and identify various contents from web browsing, the gallery, the text, the address book (phone book), etc. to one page through the double touch gesture. A page in which the various contents are gathered may be referred to as a QuickPage or a scrip board, or a screen capture page.

Turning next to FIGS. 5(a)-(c), which include display screens illustrating an operation of generating a home screen using a double touch gesture in a home screen of a mobile terminal according to an embodiment of the present invention.

Referring to FIG. 5(a), the controller 180 displays a home screen. Then, as shown in FIG. 5(b), the user performs a first touch gesture using their first finger 1 on the home screen, and then performs the second touch gesture using a second finger 2 on their other hand (while maintaining the first touch gesture).

Thus, in this situation and as shown in FIG. 5(c), the controller 180 executes or performs a home screen adding function based on the first and second touch gestures while the first touch gesture is maintained. In particular, in this example, the second touch gesture is a touch and drag or flicking operation and occurs after a predetermined time from the first touch gesture.

As shown in FIG. 5(b), the second touch gesture has a right direction. Thus, the user can intuitively know an adding operation is being performed (because the direction is in a right direction).

Accordingly, when the user performs a flicking gesture in a right direction using their second finger 2 after a predetermined time from the first touch gesture while maintaining the touch with their first finger 1 on the home screen during a home screen switching operation between a home screen 3 and a home screen 4 (FIGS. 5(a) and 5(b)), a third home screen 5 is added between the first home screen 3 and the second home screen 4 (FIG. 5(c)).

That is, as shown in FIG. 5(a), a home screen page indicator 5a displayed at a lower portion of the first home screen 3 indicates the third home screen is currently displayed. The home screen page indicator 5b shown in and FIG. 5(c) shows a home screen 5 is newly added between the first and second home screens 3 and 4 (i.e., five total home screen pages are now provided).

Next, FIGS. 6(a)-(c) are display screens illustrating an operation of deleting a home screen based on a double touch gesture performed in a home screen of a mobile terminal according to an embodiment of the present invention.

Referring to FIGS. 6(a)-(c), after the user performs the drag and hold gesture using their first finger 1 on the home screen 3, the controller 180 can perform a delete function based on an upward or downward touch and drag second gesture. The upward or downward direction touch and drag gestures are also performed after a predetermined time from the first touch gesture while the user maintains the first touch gesture with their first finger 1.

In other words, when the user performs a flicking gesture in an upward direction or a downward direction on the second home screen 4 using their second finger 2 after a predetermined time from the first touch gesture while maintaining the first finger 1 on the first home screen 3 during the home screen switching action, the controller 180 performs a function of deleting the second home screen 4 and displays the next home screen 6.

That is, as shown in FIG. 6(a), a home screen page indicator 6a displayed at a lower portion of the first home screen 3 indicated five home screens are available. After the deletion process and as shown in the home screen page indicator 6b in FIG. 6(c), the second home screen 4 is deleted from the original five home screen pages such that, in final, four home screen pages are provided.

Next, FIGS. 7(a) and 7(b) are display screens illustrating an operation of replacing a home screen based on a double touch gesture performed on a home screen of a mobile terminal according to an embodiment of the present invention. Referring to FIGS. 7(a) and 7(b), the controller 180 can replace a home screen when the user performs a left direction gesture with their second finger 2 after a drag and hold gesture using their first finger 1.

The left direction gesture is also performed after a predetermined time from the first touch gesture while the first touch gesture is maintained. In other words, when the user performs the flicking gesture in a left direction by using their second finger 2 while maintaining the touch of the first finger 1 on the first home screen 3, the controller 180 performs a function of replacing the first home screen 3 and the second home screen 4.

This operation is also intuitive to the user, because the left direction flicking second gesture feels to the user as if the home screen 4 is being slid under or replaced by the home screen 3. Further, although the flicking gesture by the second finger 2 is described herein, the present invention is not limited thereto and the flicking gesture may be the drag gesture.

Figure 5:
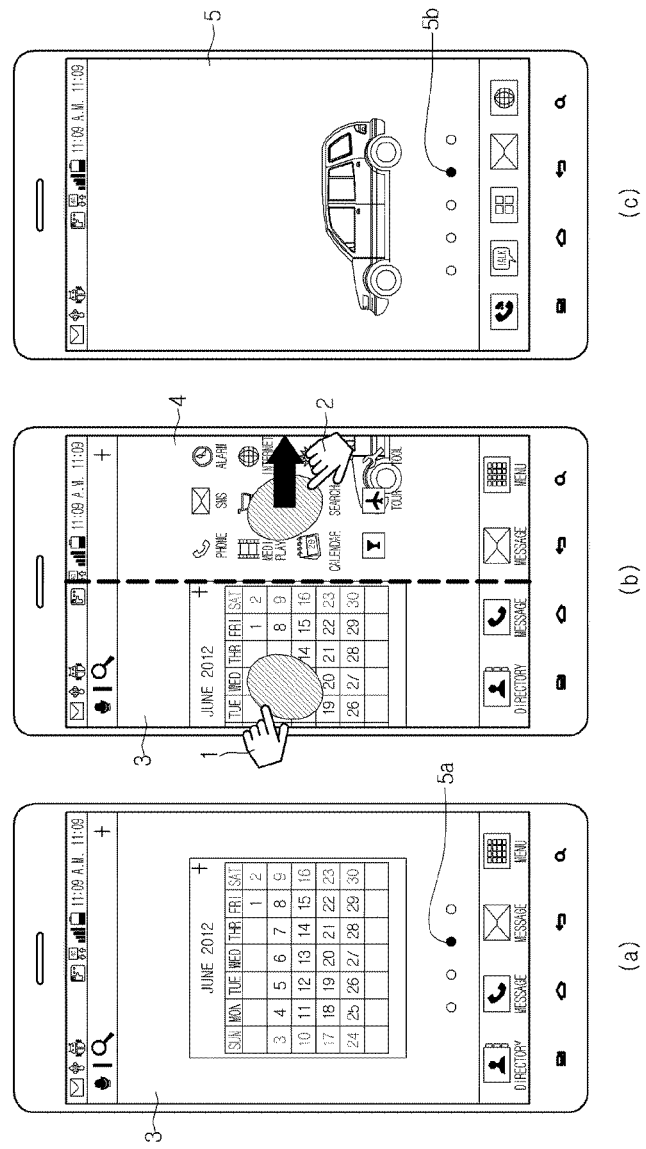
FIGS. 5(a)-(c) are display screens illustrating generating a home screen using a double touch gesture according to an embodiment of the present invention.
Figure 6:
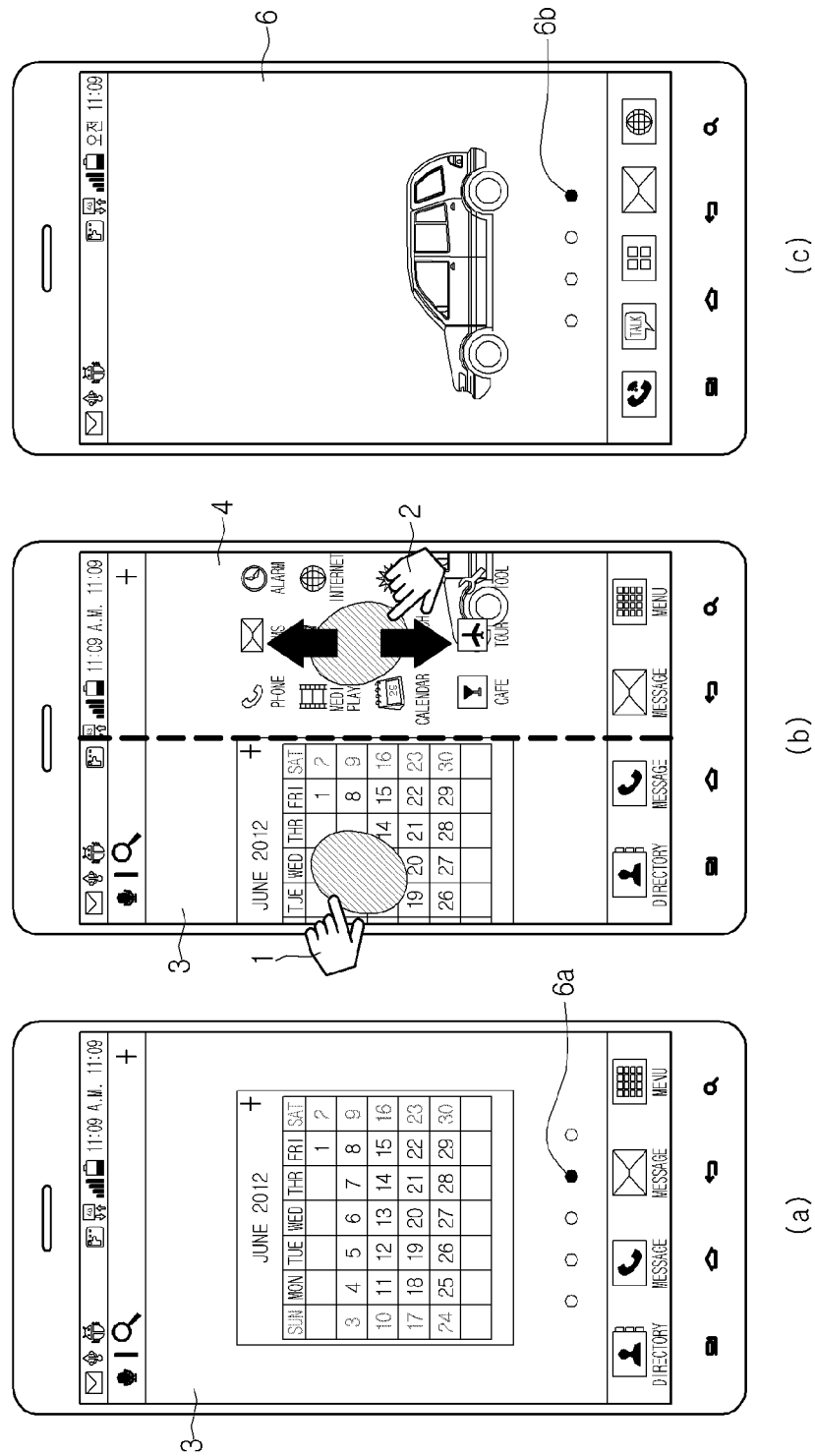
FIGS. 6(a)-(c) are display screens illustrating deleting a home screen using a double touch gesture according to an embodiment of the present invention.
Figure 7:
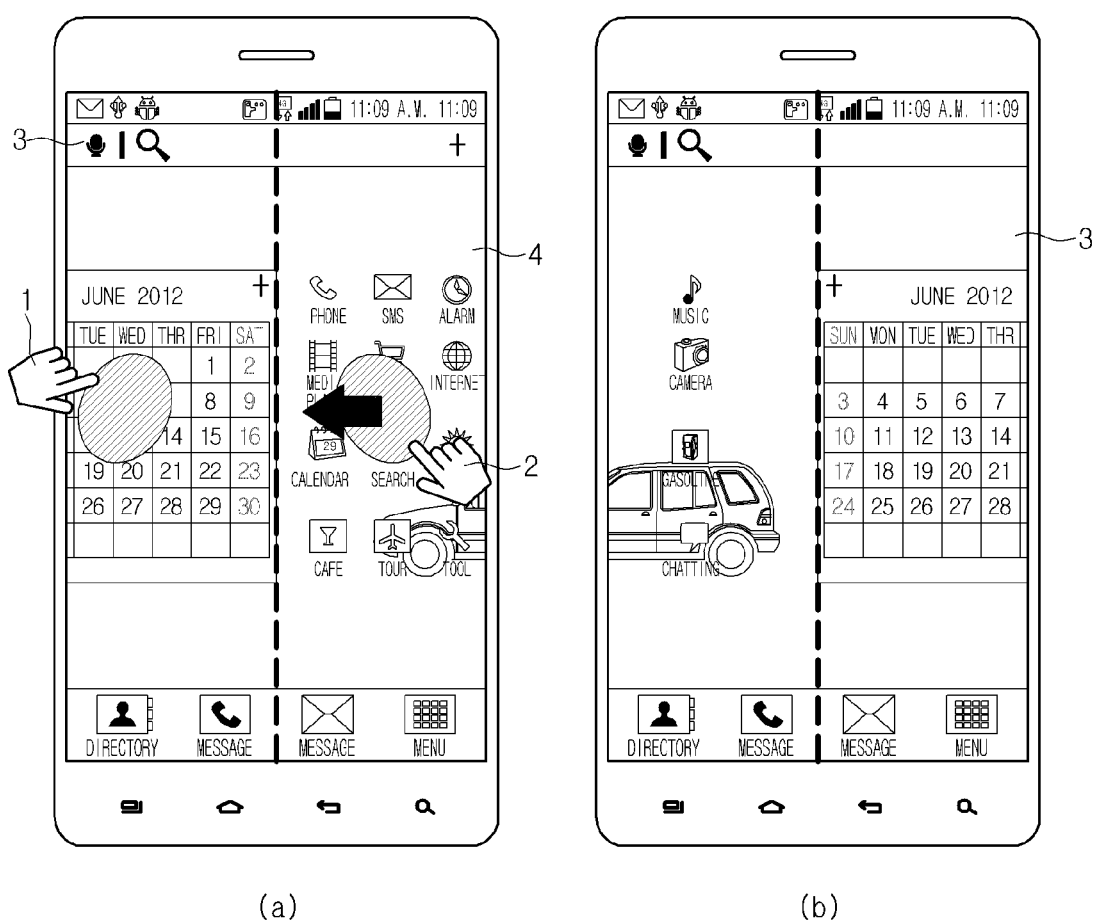
FIGS. 7(a) and 7(b) are display screens illustrating replacing a home screen using a double touch gesture according to an embodiment of the present invention.

In addition, in FIGS. 5-7, the first touch gesture includes the user touching the home screen initially displayed and then dragging the touch to switch between home screens. Thus, the controller 180 can determine that a home screen switching process is occurring. Further, the user can then pause the first touch gesture and just hold the first touch gesture at a point between two home screens as shown in the figures. Then, the user can perform the second touch gesture to have the controller 180 execute specific defined functions.

However, the user can also simply touch a point on the displayed home screen as the first touch gesture (rather than the touch, drag and hold operation), and then perform the second touch gesture to execute the desired function.

Figure 8:
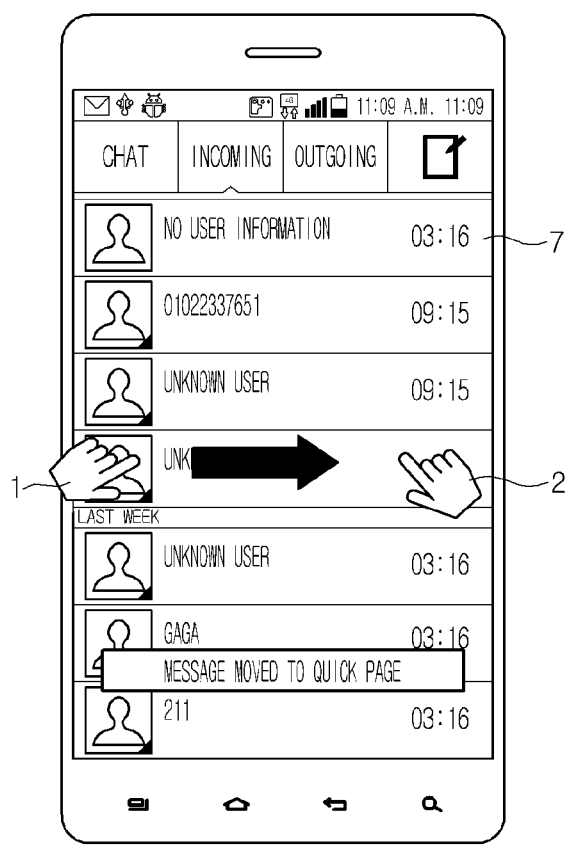
FIG. 8 is a display screen illustrating moving to a quick page in a message screen according to an embodiment of the present invention.

Next, FIG. 8 is a display screen illustrating an operation of moving to a quick page in a message screen of a mobile terminal according to an embodiment of the present invention. Referring to FIG. 8, after the user performs a touch and hold gesture using their first finger 1 on a message list screen 7, the controller 180 performs a quick page moving function based on the user's right direction gesture with their second finger 2.

The right direction gesture is also performed after a predetermined time from the first touch gesture while the touch of the first finger 1 is maintained. In other words, when the message list screen 7 is displayed, and when the user performs the flicking gesture in the right direction using their second finger 2 after a predetermined time from the first touch gesture while the first finger 1 touches a certain message, the controller 180 can generate a quick page function.

Figure 11:
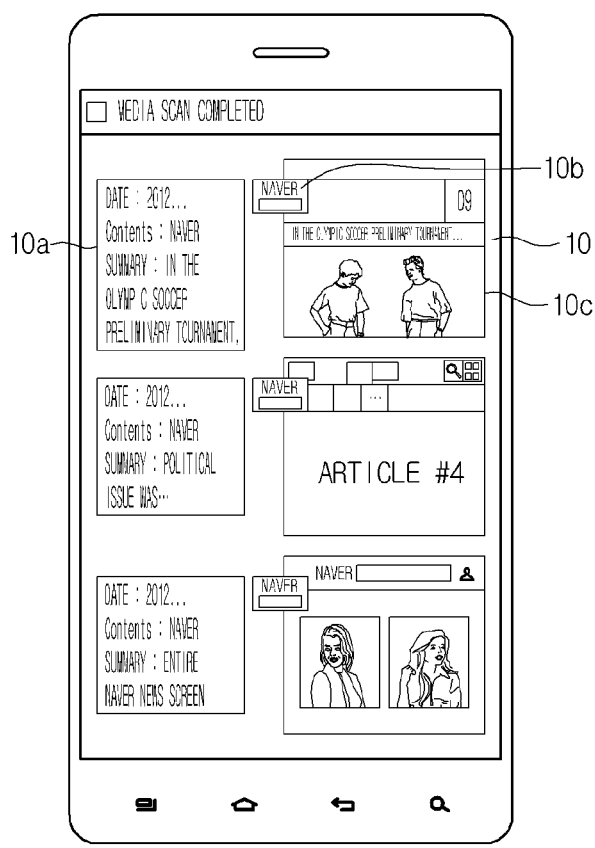
FIG. 11 is a display screen illustrating a quick page in a web browsing screen of a mobile terminal according to an embodiment of the present invention.

That is, a quick page is generated (see FIG. 11, for example). In addition, the controller 180 can immediately display the generated quick page or can store generated quick pages in the memory 160 so the user can access the quick pages later. The quick pages can also be transmitted to another terminal.

Figure 9:
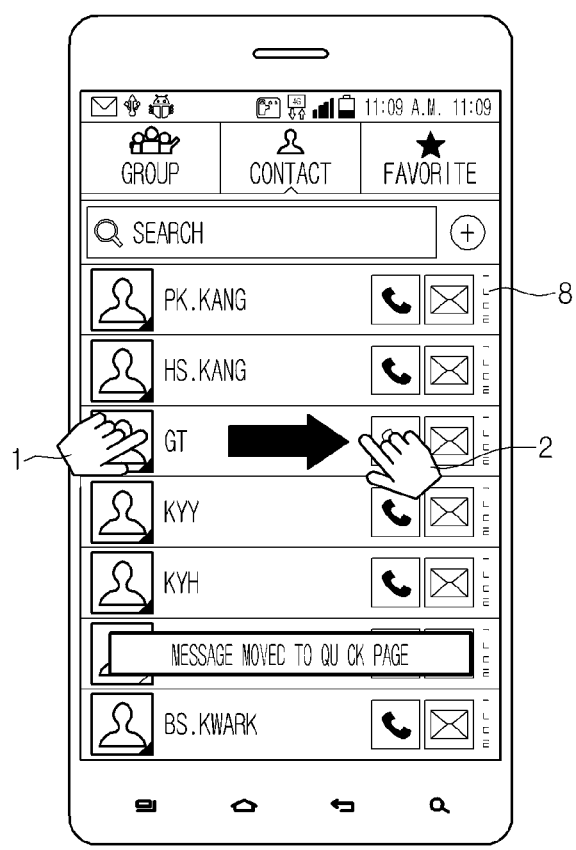
FIG. 9 is a display screen illustrating moving to a quick page in an address book screen according to an embodiment of the present invention.

Next, FIG. 9 is a display screen illustrating an operation of moving to a quick page in an address book screen of a mobile terminal according to an embodiment of the present invention. Referring to FIG. 9, after the user performs a touch and hold gesture with their first finger 1 on an address book screen 8, the controller 180 performs a quick page function based on the user performing the right direction gesture with their second finger 2.

The right direction gesture is also performed after a predetermined time from the first touch gesture while the first finger 1 is maintained on the touch screen. In other words, when the address book screen 8 is displayed, and when the user performs the flicking gesture in the right direction using their second finger 2 while their first finger 1 touches certain address book information, the controller 180 performs the quick page function.

Figure 10:
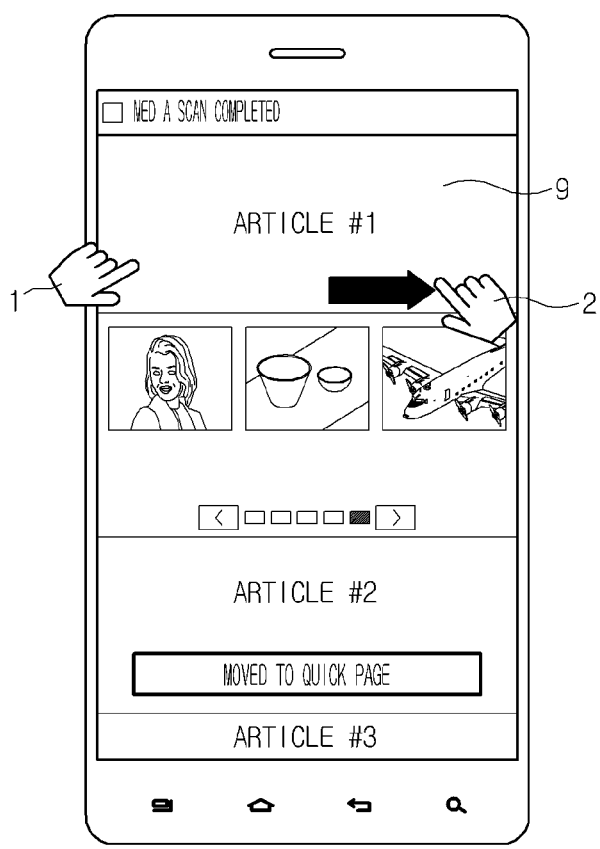
FIG. 10 is a display screen illustrating moving to a quick page in a web browsing screen according to an embodiment of the present invention.

Next, FIG. 10 is a display screen illustrating an operation of moving to a quick page in a web browsing screen of a mobile terminal according to an embodiment of the present invention. Referring to FIG. 10, after the user performs the touch and hold gesture using their first finger 1 on a web browsing screen 9, the controller 180 performs a quick page function when the user performs a right direction gesture using their second finger 2.

The right direction gesture is also performed after a predetermined time from the first touch gesture while maintaining the touch on the screen with the first finger 1 is maintained. In other words, when the web browsing screen 9 is displayed, and when the user performs the flicking gesture in the right direction using their second finger 2 while maintain the touch on a certain web content with their first finger 1, the controller 180 performs the quick page function may be performed.

In addition, the second touch gesture in combination with the first touch gesture described above can be used to delete an object on the screen such as the home screen, webpage, etc.

Next, FIG. 11 is a display screen illustrating a quick page in a web browsing screen of a mobile terminal according to an embodiment of the present invention. Referring to FIG. 11, the controller 180 displays a quick page screen 10 including web browsing information selected through the quick page function described in FIG. 10.

As shown, in the quick page screen 10, summary infatuation 10*a* of web browsing screens sent to the quick page, identification information 10*b* identifying a corresponding category, and a capture screen 10*c* is displayed. The summary information 10*a* may include a date, a content source, and summary contents of the content.

Further, the identification information 10*b* may include information for identifying a category including a corresponding content. For example, the identification information 10*b* may be an icon including a text, a figure, a color for identifying a source which provides the corresponding content. The capture screen 10*c* also includes a preview function of the corresponding content to the user. Accordingly, the user can remember a corresponding content through the capture screen 10*c* or determine whether to select the corresponding content.

Figure 12A:
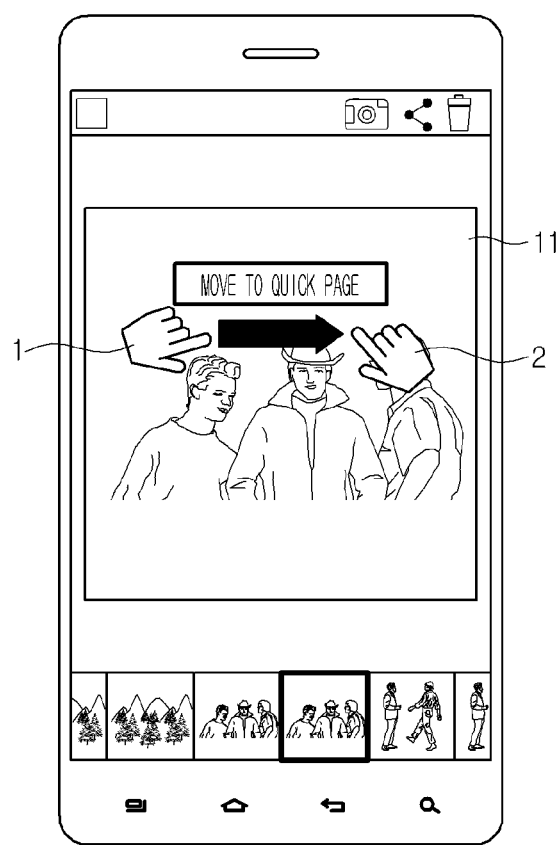
FIG. 12(a) is a display screen illustrating moving to a quick page in a gallery according to an embodiment of the present invention.
Figure 12B:
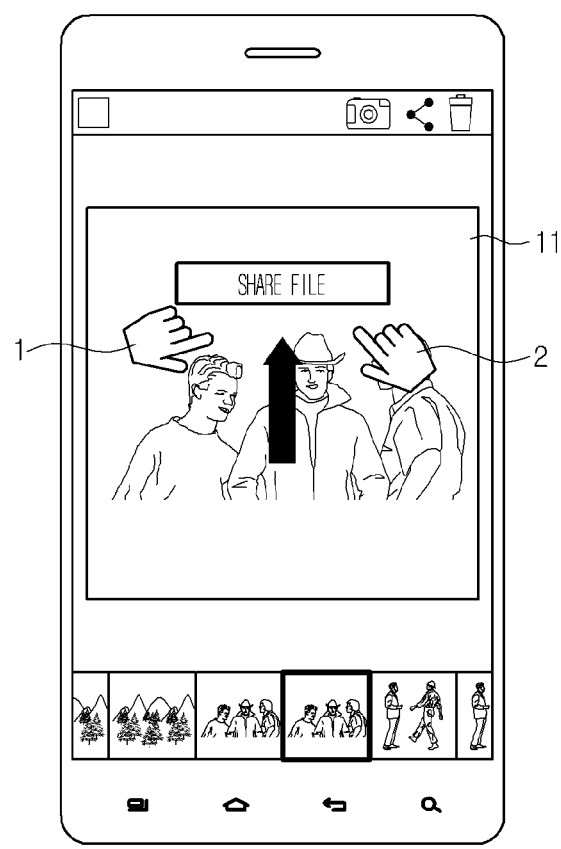
FIG. 12(b) is a display screen illustrating sharing a picture based on a double touch gesture in a gallery according to an embodiment of the present invention.
Figure 12C:
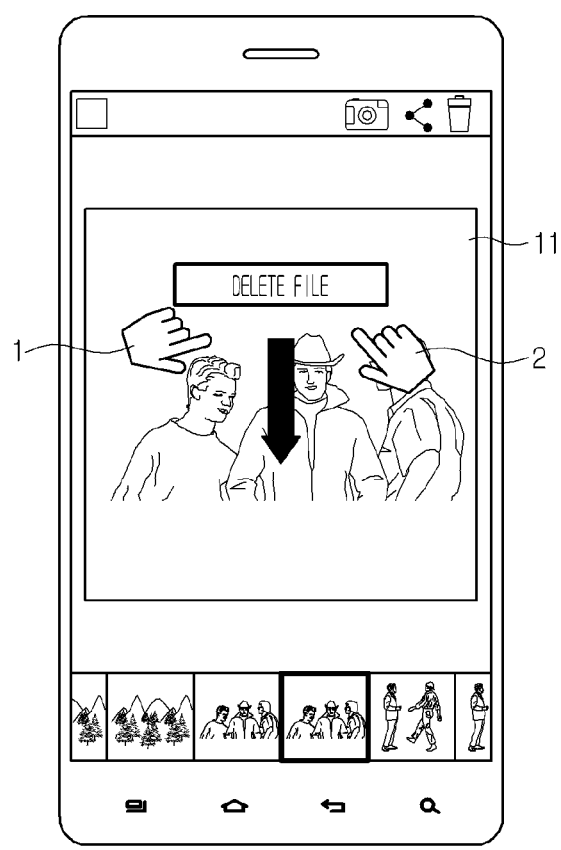
FIG. 12(c) is a display screen illustrating deleting a picture based on a double touch gesture in a gallery according to an embodiment of the present invention.

Next, FIG. 12(*a*) is a display screen illustrating an operation of moving to a quick page in a gallery of a mobile terminal according to an embodiment of the present invention. Referring to FIG. 12(*a*), after the user performs the touch and hold gesture using their first finger 1 on a gallery screen 11, the controller 180 performs the quick page function based on the user performing the right direction gesture using their second finger 2.

The right direction gesture is also performed after a predetermined time from the first touch gesture while the user maintains the first touch gesture. In other words, when a certain picture is displayed in the gallery, and when the user performs the flicking gesture in the right direction using their second finger 2 while maintaining touch of a corresponding picture with their first finger, the quick page function is performed.

Next, FIG. 12(*b*) is a display screen illustrating an operation of sharing a picture based on a double touch gesture in a gallery of a mobile terminal according to an embodiment of the present invention. Referring to FIG. 12(*b*), after the user performs the touch and hold gesture using their first finger 1 on the gallery screen 11, the controller 180 performs a sharing function based on the user performing an upward direction gesture using their second finger 2.

Further, the upward direction gesture is performed after a predetermined time from the first touch gesture while the first touch gesture is maintained. In other words, when a certain picture is displayed in the gallery, and when the user performs the flicking gesture in the upward direction using their second finger 2 while maintaining the touch with their first finger 1 on a corresponding picture, the controller 180 performs a file sharing function of the corresponding picture.

Next, FIG. 12(*c*) is a display screen illustrating an operation of deleting a picture based on a double touch gesture in a gallery of a mobile terminal according to an embodiment of the present invention. Referring to FIG. 12(*c*), after the user performs the touch and hold gesture using their first finger 1 on the gallery screen 11, the controller 180 performs a delete function based on the user performing a downward direction gesture using their second finger 2.

The downward direction gesture is also performed after a predetermined time from the first touch gesture while the first touch gesture is maintained. In other words, when a certain picture is displayed in the gallery, and when the user performs the flicking gesture on a corresponding picture in the downward direction using their second finger 2 while maintaining the first touch gesture on the corresponding picture, the controller 180 performs the delete function.

Figure 13A:
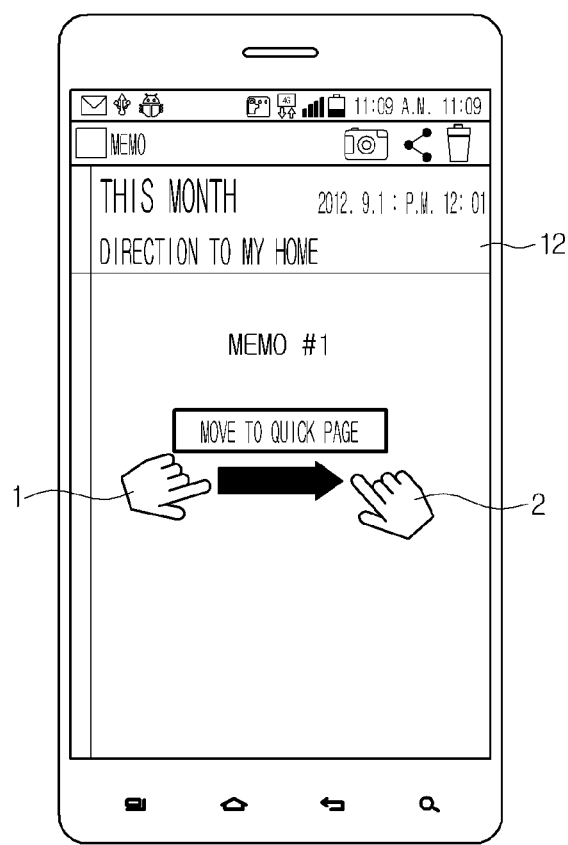
FIG. 13(a) is a display screen illustrating moving to a quick page based on a double touch gesture in a memo screen according to an embodiment of the present invention.
Figure 13B:
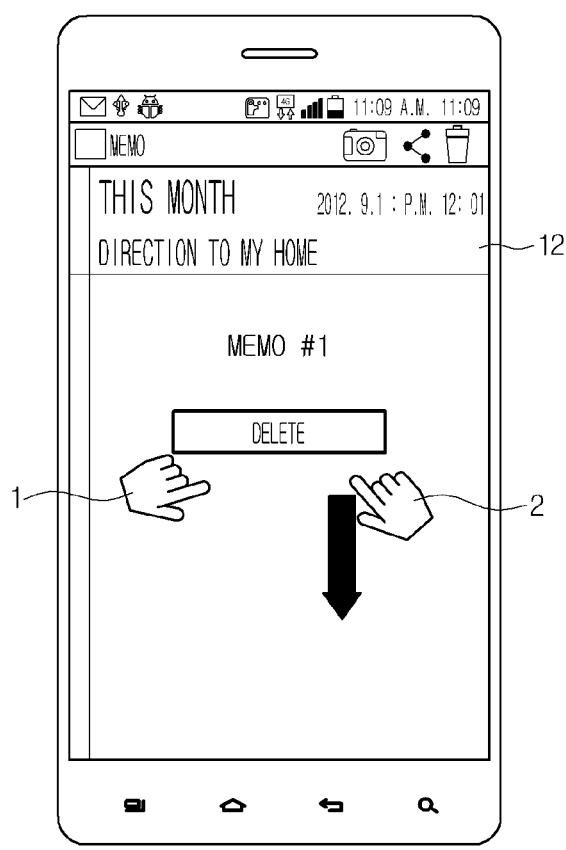
FIG. 13(b) is a display screen illustrating deleting a memo based on a double touch gesture in a memo screen according to an embodiment of the present invention.

Next, FIG. 13(*a*) is a display screen illustrating an operation of moving to a quick page based on a double touch gesture in a memo screen of a mobile terminal according to an embodiment of the present invention. Referring to FIG. 13(*a*), after the user performs the touch and hold gesture using their first finger 1 on a memo screen 12, the controller 180 performs a quick page function based on the user performing a right direction gesture using their second finger 2.

The right direction gesture is also performed after a predetermined time from the first touch gesture while the user maintains the first touch gesture. In other words, when the memo screen 12 is displayed, and when the user performs the flicking gesture in the right direction using their second finger 2 while the first finger 1 touches a corresponding memo, the controller 180 performs the quick page function.

Next, FIG. 13(*b*) is a display screen illustrating an operation of deleting a memo based on a double touch gesture in a memo screen of a mobile terminal according to an embodiment of the present invention. Referring to FIG. 13(*b*), after the user performs the touch and hold gesture using their first finger 1 on the memo screen 12, the controller 180 performs the delete function based on the user performing the downward direction gesture using their second finger 2.

The downward direction gesture is also performed after a predetermined time from the first touch gesture while the first touch gesture is maintained. In other words, when the memo screen 12 is displayed, and when the user performs the flicking gesture in the downward direction using their second finger 2 while maintain the first touch gesture on a corresponding memo, the controller 180 performs a delete function of the corresponding memo.

Figure 13C:
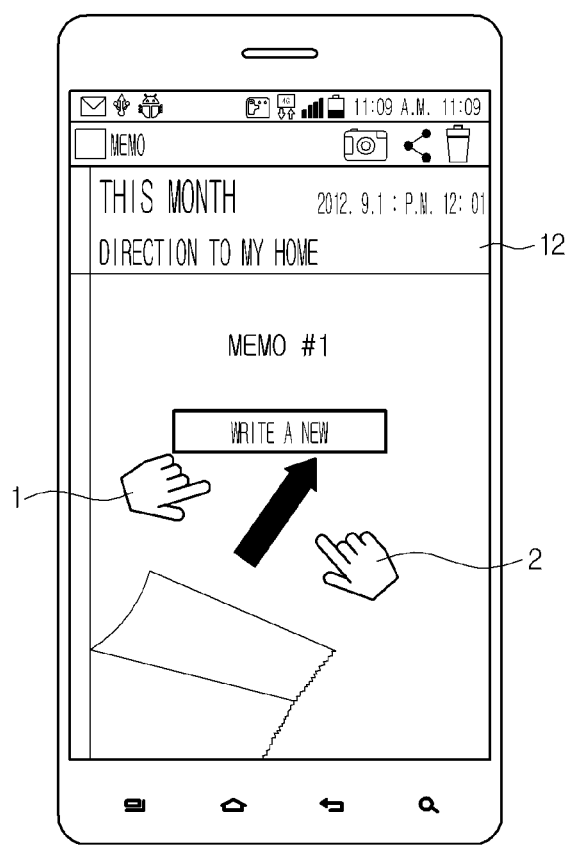
FIG. 13(c) is a display screen illustrating writing a memo based on a double touch gesture in a memo screen according to an embodiment of the present invention.

FIG. 13(c) is a display screen illustrating an operation of deleting an old memo and writing a new memo based on a double touch gesture in a memo screen of a mobile terminal according to an embodiment of the present invention. Referring to FIG. 13(c), after the user performs the touch and hold gesture using their first finger 1 on the memo screen 12, the controller 180 performs a new writing window opening function based on the user performing a right and upward direction gesture using their second finger 2.

The right and upward direction gesture is also performed after a predetermined time from the first touch gesture while the first touch gesture is maintained. In other words, when the memo screen 12 is displayed, and when the user performs the flicking gesture on a corresponding memo in a diagonal right and upward direction using their second finger 2 while maintaining the first touch gesture one the corresponding memo, the controller 180 performs an animation of tearing off the memo screen 12 corresponding to a direction of the gesture in the corresponding memo screen 12 and then displays a new memo screen 12.

Figure 14A:
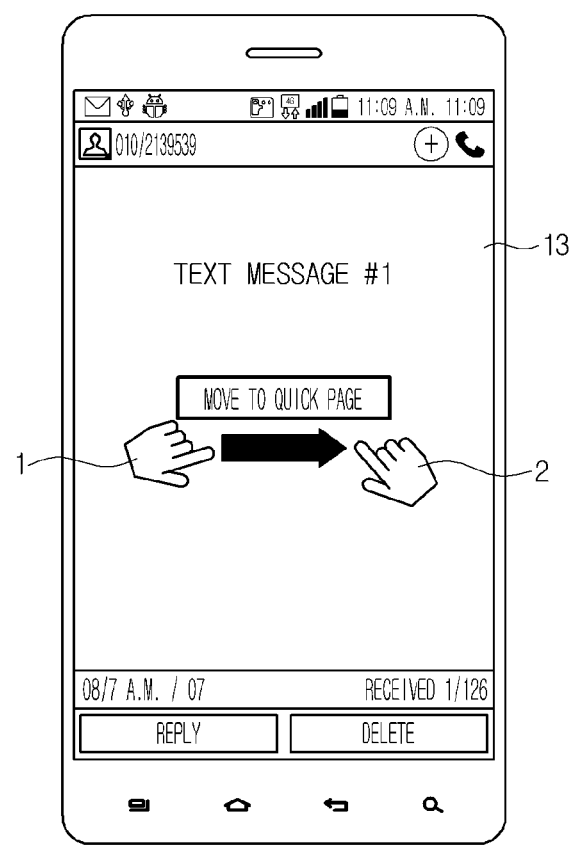
FIG. 14(a) is a display screen illustrating moving to a quick page based on a double touch gesture in a message screen according to an embodiment of the present invention.

Next, FIG. 14(a) is a display screen illustrating an operation of moving to a quick page based on a double touch gesture in a message screen of a mobile terminal according to an embodiment of the present invention. Referring to FIG. 14(a), after the user performs the touch and hold gesture using their first finger 1 on a message screen 13, the controller 180 performs a quick page moving function based on the user performing the right direction gesture with their second finger 2.

In other words, when the message screen 13 is displayed and the user touches their first finger 1 on a corresponding message, and when the user performs the flicking gesture in the right direction using their second finger 2, the controller 180 performs the quick page function.

Figure 14B:
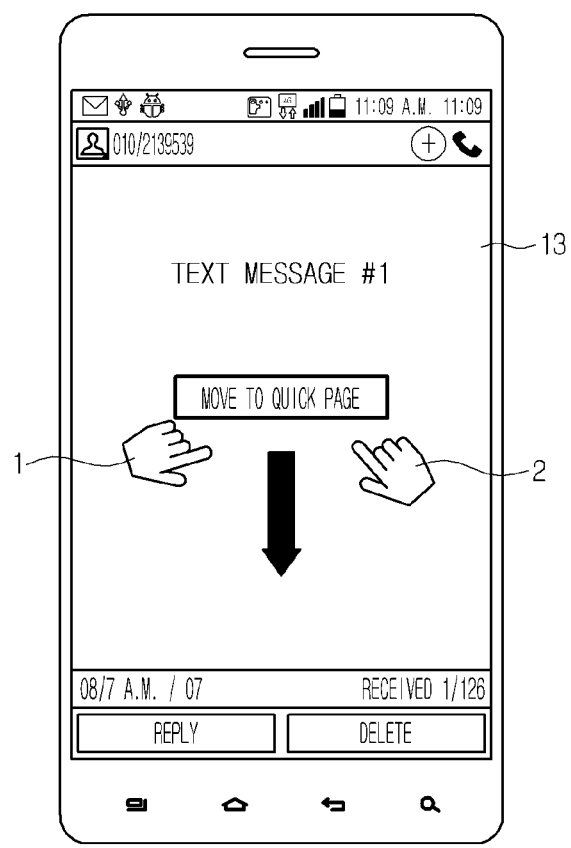
FIG. 14(b) is a display screen illustrating deleting a message based on a double touch gesture in a message screen according to an embodiment of the present invention.

Referring to FIG. 14(b), after the user performs the touch and hold gesture using their first finger 1 on the message screen 13, the controller 180 performs the delete function based on the user performing the downward direction gesture using their second finger 2. The downward direction gesture is also performed after a predetermined time from the first touch gesture while the first touch gesture is maintained.

In other words, when a certain message screen 13 is displayed and the user touches the first finger 1 on a corresponding message and performs the flicking gesture in the downward direction using their second finger 2, the controller 180 performs the delete function of the corresponding message.

Figure 15A:
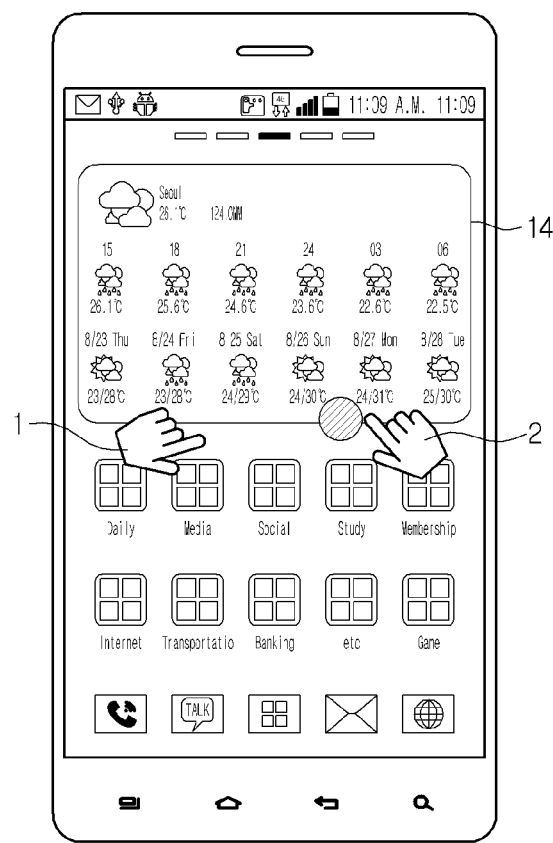
FIGS. 15(a)-(c) are display screens illustrating switching from a home screen to a quick page according to an embodiment of the present invention.
Figure 15B:
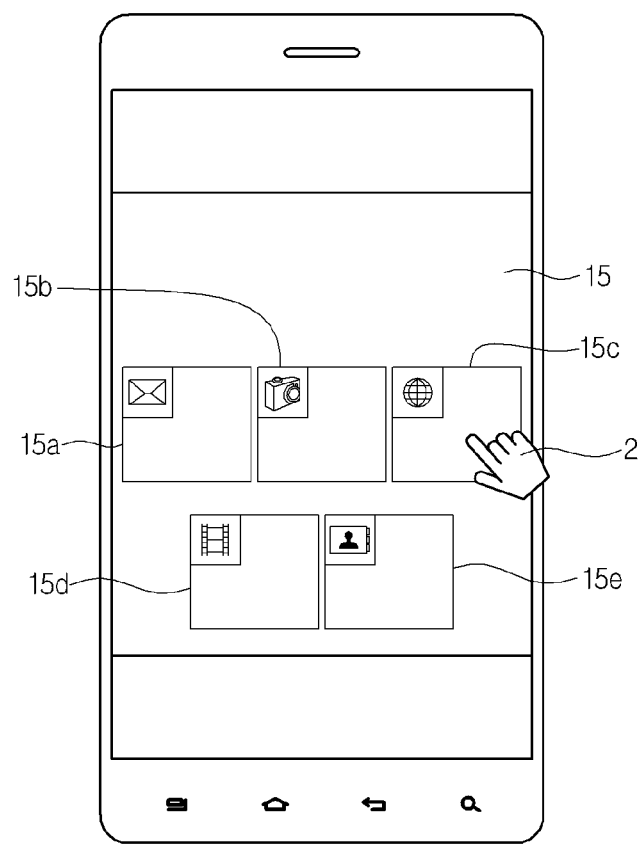
Figure 15C:
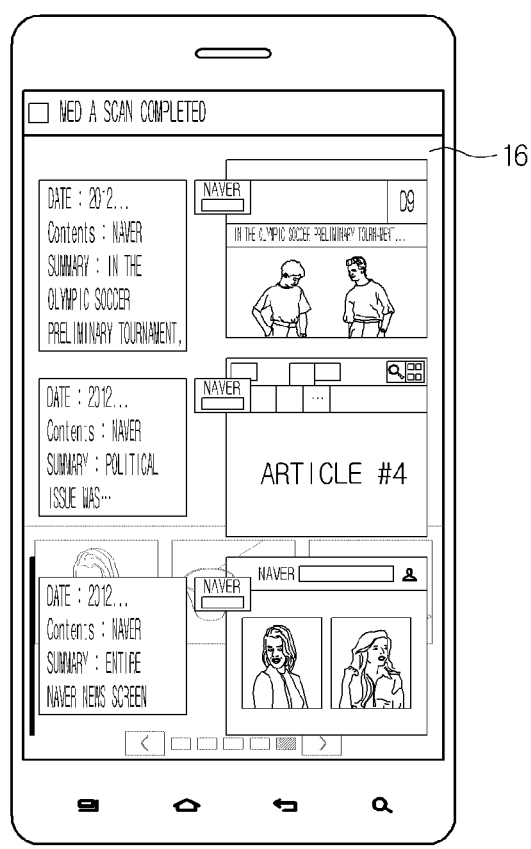

Next, FIGS. 15(a)-(c) are display screens illustrating an operation of switching from a home screen to a quick page of a mobile terminal according to an embodiment of the present invention. Referring to FIG. 15(a), after the user performs the touch and hold gesture using their first finger 1 on a home screen 14, the controller 180 performs a function of switching to the quick page based on the user performing a double tap gesture with their second finger 2.

In other words, when the user touches the first finger 1 on a certain point in the home screen 14, and when the user performs the double tap gesture using their second finger 2, the controller 180 performs a function of switching to a quick page collection page per content, as shown in FIG. 15(b).

In addition, a quick page collection per content screen 15 may be performed by classifying contents of the quick page content into separate folders according to each content. For example, the quick page collection per content screen 15 may include a text a message folder 15a, a gallery folder 15b, a web page folder 15c, a video folder 15d, and an address book folder 15e.

Further, the text message folder 15a may include contents collected into the quick page by a user's choice from the text message. Also, the gallery folder 15b may include contents collected into the quick page by the user's choice from a photo content.

In addition, the web page folder 15c may include contents collected into the quick page by the user's choice from a web page content, and the video folder 15d may include contents collected into the quick page by the user's choice from a video content. The address book folder 15e may include contents collected into the quick page by the user's choice from an address book content.

When each content is displayed in separate folders, the quick page collection per content screen 15 may display, in each folder, identification information which may identify contents of a corresponding folder. Here, the identification information may include an icon for identifying a content of the corresponding information.

For example, the text message folder 15a may include an icon which symbolizes a text message, the gallery folder 15b may include an icon which symbolize a gallery, the web page folder 15c may include an icon which symbolizes a web page, the video folder 15d may include an icon which symbolizes a video, and the address book folder 15e may include an icon which symbolizes an address book.

Also, not only in the home screen but also in any certain screen, the function of switching to the quick page screen may be performed by the double tap gesture and the first touch gesture. In addition, when a certain quick page screen is selected in the quick page collection per content screen 15 as shown in FIG. 15(b), a corresponding quick page screen 16 as shown in FIG. 15(c) may be switched to. As shown, contents collected into the quick page by the user's choice among the web page contents are collected in the quick page screen 16.

Figure 16:
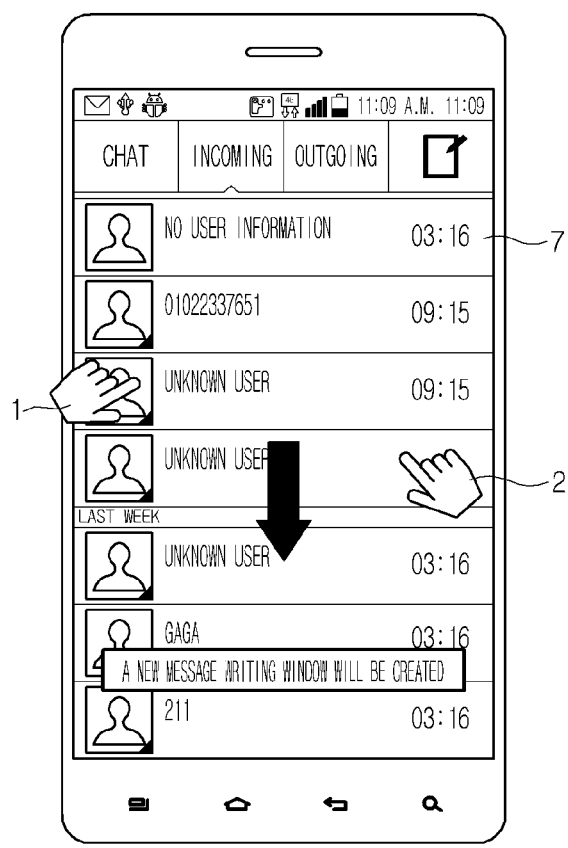
FIG. 16 is a display screen illustrating displaying a new message writing window in a message list screen according to an embodiment of the present invention.

Next, FIG. 16 is a display screen illustrating an operation of displaying a new message writing window in a message list screen of a mobile terminal according to an embodiment of the present invention.

Referring to FIG. 16, after the user performs the touch and hold gesture using their first finger 1 on the message list screen 7 with respect to a certain message list row and then performs the downward touch gesture using their second finger 2 with respect to a lower area of a corresponding message row, the controller 180 performs an animation which separates message rows upward and downward and displays a new message writing window.

In other words, when the message list screen is displayed and the user touches the first finger 1 on a certain message row and performs the downward direction gesture which touches and drags a lower area of a corresponding message row using their second finger 2, the controller 180 creates a new message writing window.

In addition, the new message writing window may be created between a message row held with the first finger 1 and a message row touched with the second finger 2. The user can then create a new message by writing on the new window.

Figure 17:
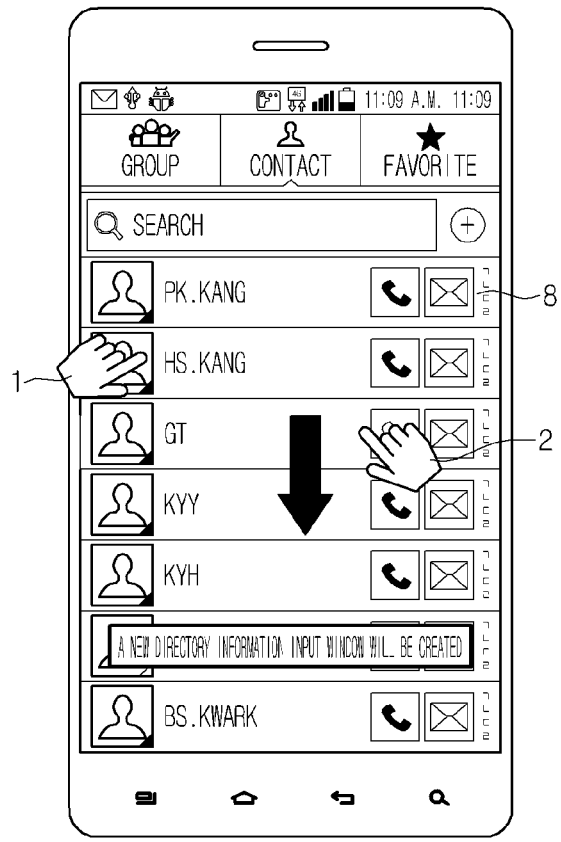
FIG. 17 is a display screen illustrating adding new address book information to an address book list screen according to an embodiment of the present invention.

Next, FIG. 17 is an example screen view for explaining an operation of adding new address book information to an address book list screen of a mobile terminal according to an embodiment of the present invention. Referring to FIG. 17, after the user performs the touch and hold gesture using their first finger 1 on a certain address book information row in the address book list screen 8 and then performs the downward direction touch gesture on a lower area of a corresponding address book information row using their second finger 2, the controller 180 displays the new address book information input window.

In other words, when the address book list screen is displayed and the user touches the first finger 1 on a certain address book row and performs the downward direction gesture which touches and drags a lower area of a corresponding address book row using their second finger 2, the controller 180 creates a new address book information input window. The new address book information input window may also be created between an address book row held using their first finger 1 and an address book row touched using their second finger 2. The user can then input a new contact on the new address book input window.

Figure 18:
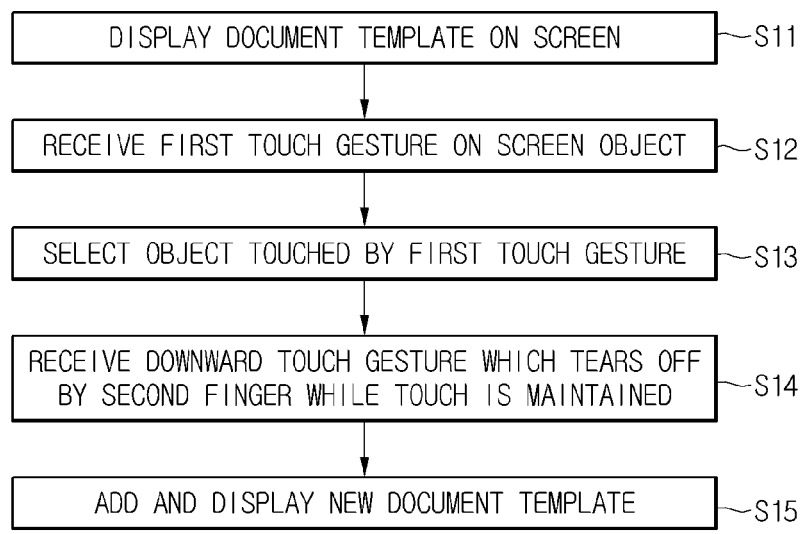
FIG. 18 is a flowchart illustrating adding a new template in a document template according to an embodiment of the present invention.

Next, FIG. 18 is flowchart illustrating an operation of adding a new template in a document template of a mobile terminal according to an embodiment of the present invention. Referring to FIG. 18, the controller 180 displays a document template on the display unit 151 of the mobile terminal 100 (S11). Then, the user performs the first touch gesture using their first finger (S12). The first touch gesture may be the touch and hold gesture. The mobile terminal 100 then selects an object touched by the first touch gesture (S13).

Next, the user performs a downward touch gesture which tears off another object using the second finger while maintaining the first touch gesture (S14). The mobile terminal 100 then displays the new document template (S15).

In other words, when the document template is displayed and the user touches a certain point using their first finger 1 and performs a downward direction gesture which touches and tears off a point below a corresponding point using their second finger 2, the controller creates a new document template. Further, the new document template may be created by a point held by the first finger and a point touched by the second finger. The user can also input new content in the new document template.

Figure 19:
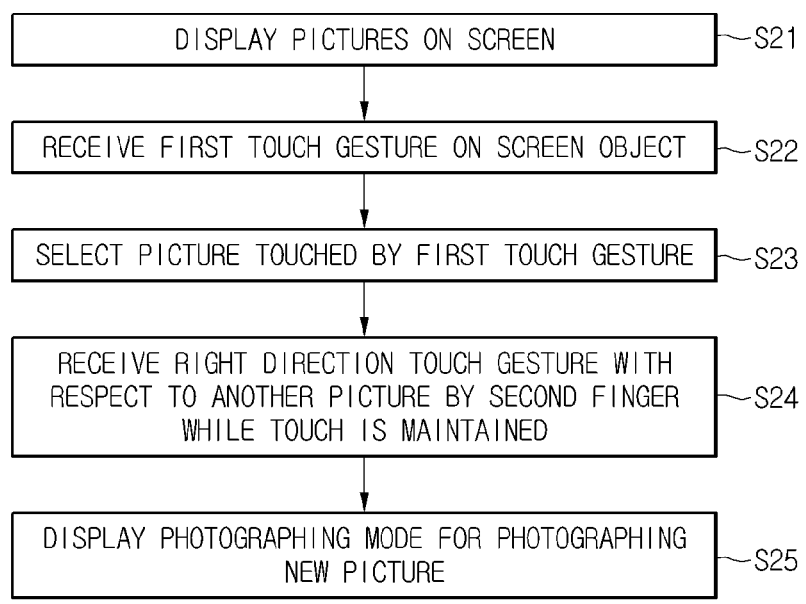
FIG. 19 is a flowchart illustrating a photographing mode in a gallery according to an embodiment of the present invention.

Next, FIG. 19 is a flowchart illustrating an operation of performing a photographing mode in a gallery of a mobile terminal according to an embodiment of the present invention. Referring to FIG. 19, the controller 180 displays pictures on the gallery screen of the mobile terminal 100 (S21). Further, the user performs an input of the first touch gesture with their first finger with respect to a certain picture on the gallery screen (S22). The first touch gesture may be the touch and hold gesture. The mobile terminal 100 then selects a picture touched by the first touch gesture (S23).

While the first touch gesture of the first finger is maintained, the user performs an input of the right direction touch gesture which separates another picture using their second finger (S24). The mobile terminal 100 then displays the photographing mode for photographing a new picture (S25).

In other words, when the gallery screen is displayed and the user touches with the first finger with respect to a certain picture and performs a right direction gesture for touching and separating a picture located next to a corresponding picture with their second finger, the controller 180 executes a photographing mode. The photographing mode may be displayed between a picture area held by the first finger and a picture area touched by the second finger. The user can thus take new pictures in the photographing mode.

Thus, according to embodiments of the present invention, a gesture for two points on the screen is clearly defined. Therefore, the present invention defines a user interface using a gesture which is intuitive to the user while the gesture is distinguished from the pinch zoom in or pinch zoom out gesture.

According to an embodiment of the present invention, the above described method may be implemented in a processor readable code on a medium which records a program. Examples of a processor readable medium include ROM, RAM, CD-ROMs, magnetic tapes, floppy disks, and optical data storage devices, and the processor readable medium may also be implemented via transmission through internet.

While the present invention has been particularly described with reference to embodiments thereof, it should be noted that various modifications may be made therein without departing from the spirit and scope of the present invention. For example, the double touch gesture may be used in order to perform writing anew, sharing, and deleting services of various office documents. Also, in addition to the writing anew, sharing, and deleting, the double touch gesture may be used to perform a service of modifying a written content. Further, although embodiments of the present invention have been described with respect to the mobile terminal, the present invention can apply to the stationary terminal.

Therefore, the present invention should not be construed as limited to only the example embodiments set forth herein but rather should be understood to cover all modifications, equivalents or alternatives falling within the scope and technical teens of the invention.

What is claimed is:

1. A mobile terminal, comprising:
 a wireless communication unit configured to wirelessly communicate with at least one other terminal;
 a touch screen display; and
 a controller configured to:
  display a plurality of home screens that can slidably be displayed on the touch screen display,
  receive a first touch gesture on a first home screen currently displayed on the touch screen display,
  receive a second touch and drag gesture on a second home screen slidably appearing on the touch screen display, said second touch and drag gesture having a dragging direction and occurring after a predetermined time from the beginning of the first touch gesture while the first touch gesture is maintained, and
  perform a first preset function based on the second touch and drag gesture having a first dragging direction and perform a second preset function different from the first preset function based on the second touch and drag gesture having a second direction.

2. The mobile terminal of claim 1, wherein the first preset function corresponds to adding a new home screen between the first and second home screens.

3. The mobile terminal of claim 1, wherein the second preset function corresponds to deleting the second home screen.

4. The mobile terminal of claim 1, wherein the first preset function corresponds to switching the first and second home screens.

5. A mobile terminal, comprising:
 a wireless communication unit configured to wirelessly communicate with at least one other terminal;
 a touch screen display; and
 a controller configured to:
  receive a first touch gesture at a first point on the touch screen display to select an object displayed on the touch screen display, receive a second touch gesture at a second point on the touch screen display different than the first point, said second touch gesture having a dragging direction and occurring after a predetermined time from the beginning of the first touch gesture while the first touch gesture is maintained, perform a first preset function based on the second touch gesture having a first dragging direction and perform a second preset function different from the first preset function based on the second touch gesture having a second direction, display a screen including a plurality of entries on the touch screen display, and wherein the first touch gesture corresponds to a touch and hold operation of a first entry on the screen, and the second touch gesture corresponds to a touch and drag operation on the first entry.

6. The mobile terminal of claim 5, wherein the plurality of entries are received messages, and wherein the first preset function corresponds to a quick page function.

7. The mobile terminal of claim 5, wherein the plurality of entries are received messages, and wherein the second preset function corresponds to creating a new message.

8. The mobile terminal of claim 5, wherein the plurality of entries are contacts in an address book, and wherein the first touch gesture corresponds to a touch and hold operation of a first contact on the address book screen, and the second touch gesture corresponds to a touch and drag operation on the first contact.

9. The mobile terminal of claim 8, wherein the first preset function corresponds to a quick page function.

10. The mobile terminal of claim 8, wherein the second preset function corresponds to creating a new contact.

11. A mobile terminal, comprising:

a wireless communication unit configured to wirelessly communicate with at least one other terminal;

a touch screen display; and a controller configured to:

receive a first touch gesture at a first point on the touch screen display to select an object displayed on the touch screen display, receive a second touch gesture at a second point on the touch screen display different than the first point, said second touch gesture having a dragging direction and occurring after a predetermined time from the beginning of the first touch gesture while the first touch gesture is maintained, and perform a first preset function based on the second touch gesture having a first dragging direction and perform a second preset function different from the first preset function based on the second touch gesture having a second direction, wherein the touch screen display is further configured to display a gallery of at least one of a still image and a moving image, wherein the first touch gesture corresponds to a touch, drag and hold operation of a corresponding still image or moving image to slidably display displayed the still image or moving image in the gallery, and the second touch gesture corresponds to a touch and drag operation on the corresponding still image or moving image, and wherein the second preset function corresponds to entering the mobile terminal into a photographing mode.

12. A method of controlling a mobile terminal, the method comprising:

allowing, via a wireless communication unit, wireless communication with at least one other terminal;

displaying a plurality of home screens that can slidably be displayed on the touch screen display, receiving a first touch gesture on a first home screen currently displayed on the touch screen display;

receiving a second touch and drag gesture on a second home screen slidably appearing on the touch screen display, said second touch and drag gesture having a dragging direction and occurring after a predetermined time from the beginning of the first touch gesture while the first touch gesture is maintained; and performing, via the controller, a first preset function based on the second touch and drag gesture having a first dragging direction and performing a second preset function different from the first preset function based on the second touch and drag gesture having a second direction.

* * * * *